United States Patent [19]

Maringer et al.

[11] Patent Number: 5,256,489
[45] Date of Patent: Oct. 26, 1993

[54] FLAME RETARDANT POLYMERIC COMPOSITIONS

[75] Inventors: Melvin F. Maringer, Cincinnati; James W. Biggs, Lebanon, both of Ohio

[73] Assignee: Quantum Chemical Corporation, Cincinnati, Ohio

[21] Appl. No.: 37,838

[22] Filed: Mar. 29, 1993

Related U.S. Application Data

[60] Division of Ser. No. 921,617, Aug. 3, 1992, Pat. No. 5,225,469, which is a continuation of Ser. No. 562,762, Aug. 3, 1990, abandoned.

[51] Int. Cl.$^5$ .............................................. B32B 27/32
[52] U.S. Cl. .................................... 428/450; 428/522; 428/523
[58] Field of Search ............... 524/265, 314, 311, 490; 428/522, 523, 450

[56] References Cited

U.S. PATENT DOCUMENTS 4,381,362  4/1983  Biggs et al. .................... 524/305

Primary Examiner—Joseph L. Schofer
Assistant Examiner—Jeffrey T. Smith
Attorney, Agent, or Firm—Kenneth D. Tremain; Gerald A. Baracka

[57] ABSTRACT

The present invention relates to improved polymeric compositions based on ethylene-vinyl ester and ethylene-alkyl acrylate copolymers which can be crosslinked to provide insulation coatings for wire and cable products. The copolymer compositions contain a hydrated inorganic filler, an alkoxysilane, an antioxidant and a polymeric processing additive. Organic peroxides are preferably employed to facilitate crosslinking. An improved method for providing the improved compositions and electrical conductors coated with the crosslinkable polymeric compositions are also provided by the invention.

16 Claims, No Drawings

FLAME RETARDANT POLYMERIC COMPOSITIONS

CROSS REFERENCE TO RELATED APPLICATIONS

This application is a continuation of application Ser. No. 07/921,617 now U.S. Pat. No. 5,225,469, filed Aug. 3, 1992, which is a continuation of application Ser. No. 07/562,762, filed Aug. 3, 1990, now abandoned.

BACKGROUND OF THE INVENTION

1. Field of the Invention

This invention relates to polymeric compositions which are readily crosslinkable to produce heat resistant and flame resistant products useful in the production of coated wire and cable products as well as film sheet and molded products. More particularly, the invention relates to crosslinkable ethylene-vinyl ester and ethylene-alkyl acrylate copolymers which during processing, i.e., in the uncrosslinked state, exhibit improved scorch resistance and improved processability and, after crosslinking, exhibit improved resistance to degradation by heat aging.

2. Description of the Prior Art

One of the most important uses of fire resistant polymer compositions is for wire and cable insulation. In electrical environments both insulating and fire resistant properties are considered to be necessary. For flame resistance, extrudable compositions available to the wire and cable art were at one time required to contain halogenated polymers, such as chlorinated polyethylene, polyvinyl chloride, chlorinated polybutadiene, chlorinated paraffin, etc., together with antimony trioxide. It was necessary that both components be present in sizable quantities. Alternatively, a coating of chlorosulfonated polyethylene paint was applied to a nonflame retardant insulating compound which required an additional manufacturing operation.

In certain applications a problem existed in that electrical failures occurred due to migration of the organic insulating component used. The problem was solved through the addition of hydrated alumina to compositions whose organic binder consisted of butyl rubber, epoxy resins or polyester resins. Such compositions are disclosed in Kessel et al U.S. Pat. Nos. 2,997,526, 2,997,527, and 2,997,528. These compositions, however, failed to possess an acceptable balance of processability and extrudability characteristics, physical and electrical properties, heat resistance and flame resistance. Furthermore, these compositions exhibited unacceptable tensile strength, elongation and percent elongation after aging.

Fire retarding polymeric compositions exhibiting improved moisture and heat resistance comprised of a crosslinkable polymer, such as ethylene-vinyl acetate copolymer, one or more silanes and one or more hydrated inorganic fillers have found wide acceptance in the wire and cable industry. Such compositions are disclosed in U.S. Pat. Nos. 3,832,326 and 3,922,442 to North et al and U.S. Pat. Nos. 4,349,605 and 4,381,362 to Biggs et al. Besides the crosslinkable polymer, silane and hydrated filler, additives such as pigments, stabilizers, lubricants, and antioxidants are typically incorporated. These formulated compositions exhibit a unique balance of processability, improved physical and electrical properties together with a high degree of flame and fire retardance. Moreover, these highly desirable results are achieved (a) without the use of halogenated polymers, such as polyvinyl chloride and chlorosulfonated polyethylene, thereby eliminating potential for generating dangerous hydrogen chloride fumes; (b) without the use of carbon black thereby making it possible to formulate colored insulations; (c) without the application of any flame retardant coatings thereby eliminating the need for an additional step in manufacturing operations after the insulating compound is extruded onto the conductor; and (d) without the use of antimony trioxide thereby eliminating the need to use a substantial quantity of an expensive compounding ingredient.

The compositions of North et al and Biggs et al find particular use as white and colored insulation compositions which can be extruded over metal, e.g., copper or aluminum, conductors to provide a single layer insulating and jacketing composition which meets the automotive primary SAE J1128 standards and UL 125° C. appliance wire SIS standards. These insulating compositions are particular useful for the insulation of switchboard wire, appliance wire and automotive wire where a unique combination of superior electrical properties combined with resistance to the degradative effects of heat and flame are essential and where low smoke density and non-corrosive fumes are desirable.

Antioxidants disclosed to be useful for the North et al and Biggs et al compositions include polymerized 1,2-dihydro-2,2,4-trimethyl quinoline, distearyl-3,3'-thiodipropanate (DSTDP), and combinations of DSTDP with hindered phenols, such as tetrakis(methylene(3,5-di-t-butyl-4-hydroxyhydrocinnamate)) methane. Lubricants which are disclosed include fatty acid soaps, such as calcium stearate and aluminum stearate, silicone oils, long chain aliphatic amides, natural and synthetic waxes and low molecular weight polyethylenes. A combination of lauric acid and ethylene-bis-stearamide is disclosed to be an especially useful lubricant.

Low molecular weight products which are mixtures of light-colored aliphatic resins having molecular weights below 2000 are used as processing modifiers for plastic compounds. Literature for these processing agents indicates that they possess a natural tackiness at processing temperatures which facilitates uniform blending of highly filled polymer compositions. It is recognized within the industry that if compounding ingredients are not uniformly dispersed, physical properties of the resulting compositions are adversely affected. These processing agents are further indicated to provide some viscosity reduction during processing to improve flow characteristics and are suggested for use with TPO compounds, flame retardant formulations and filled polymeric systems. There is no suggestion, however, that the aliphatic resin processing agents can be utilized in crosslinkable ethylene-vinyl ester copolymer compositions of the type disclosed by North et al and Biggs et al containing a silane and hydrated inorganic filler or that significant advantages in the crosslinked product will result therefrom.

It is an object of this invention to provide improved crosslinkable flame retardant polymeric compositions based on ethylene-vinyl ester copolymers and ethylene-alkyl acrylate copolymers which exhibit superior processing characteristics and have significantly improved resistance to scorch.

It is a further object to provide crosslinked compositions which exhibit improved resistance to oxidative degradation.

SUMMARY OF THE INVENTION

In accordance with the present invention these and other objectives are realized by the use of a polymeric processing agent, by itself or in combination with other known processing additives. The utilization of the polymeric processing agent substantially extends scorch time during processing of the compositions without adversely affecting the cure rate and the physical properties of the crosslinked product. Scorch retarders typically have a detrimental effect on the cure rate, degree of cure, cured physical properties or a combination of these parameters. Additionally, the resulting crosslinked compositions unexpectedly exhibit significantly improved resistance to degradation by heat aging.

The crosslinkable polymeric compositions of the present invention are comprised of (1) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof; (2) 80 to 400 phr hydrated inorganic filler; (3) 0.5 to 5 phr of an alkoxysilane; (4) 0.5 to 8 phr antioxidant; and (5) 0.25 to 8 phr of a low molecular weight polymeric processing additive. Optionally, from 0.25 to 5 phr of a second processing additive selected from the group consisting of a fatty acid, a calcium soap of a fatty acid, an aluminum soap of fatty acid, a fatty acid amide, a mixture of fatty acids and fatty acid amides, a natural or synthetic wax or a low molecular weight polyethylene will also be present. In a particularly useful embodiment of the invention the formulation will also contain from 1 to 8 phr of a chemical crosslinking agent, preferably an organic peroxide. The low molecular weight polymeric processing additive preferably is a mixture of a hydrocarbon resin derived from cracked petroleum distillates and an ethylene-vinyl ester copolymer resin.

DETAILED DESCRIPTION OF THE INVENTION

The present invention relates to improved polymeric compositions comprising copolymers of ethylene and a vinyl ester of an aliphatic carboxylic acid, an alkyl acrylate or an alkyl methacrylate, a silane, and a hydrated inorganic filler. In addition to the foregoing, the compositions also contain an antioxidant or combination of antioxidants and a low molecular weight polymeric processing additive. Optionally, other processing agents, such as a fatty acid and/or fatty acid derivative, and crosslinking agents, such as organic peroxides, can also be present in the formulation. By the use of the polymeric processing agents, it is possible to significantly increase the scorch resistance of the uncured composition during processing and, after crosslinking, to obtain products which exhibit a marked increase in heat stability. The compositions of this invention are crosslinkable and find particular utility as wire and cable insulation.

The terms "crosslink" and "cure" and their derivative forms are employed synonymously herein and are ascribed their normal art recognized meaning, i.e., they denote the formation of primary valence bonds between polymer molecules. Scorching is used in the conventional sense to denote premature crosslinking of the compositions during processing.

Controlled crosslinking can be accomplished using any of the known procedures such as chemical means including peroxide crosslinking or silane crosslinking; by radiation using cobalt-60, accelerators, $\beta$-rays, $\gamma$-rays, electrons, X-rays, etc.; or thermally. The basic procedures for crosslinking polymers are well known to the art. All parts and percentages referred to in the specification and claims which follow are on a weight basis unless otherwise indicated.

THE ETHYLENE COPOLYMER

The polymeric component of the present compositions is a copolymer of ethylene and a comonomer which may be a vinyl ester or an alkyl acrylate, the latter being used in the generic sense to encompass esters of both acrylic and methacrylic acid. The vinyl ester may be a vinyl ester of a $C_2-C_6$ aliphatic carboxylic acid, such as vinyl acetate, vinyl propionate, vinyl butyrate, vinyl pentanoate or vinyl hexanoate. The acrylates may be any of the $C_1-C_6$ alkyl esters of acrylic or methacrylic acid including, for example, methyl, ethyl, propyl, butyl, pentyl or hexyl acrylate or methacrylate.

A preferred copolymer comprising the polymeric component of this invention is an ethylene-vinyl acetate copolymer (EVA) containing about 9% to about 45% and, more preferably, 9% to about 30%, vinyl acetate, with the balance being ethylene. Terpolymers of ethylene, vinyl acetate and other known olefinic monomers polymerizable therewith can also be employed. Generally, if a third monomer is present it will not constitute more than about 15% of the polymer composition.

Another preferred copolymer is derived from the copolymerization of ethylene and butyl acrylate. Useful ethylene-butyl acrylate copolymers (EBA) will contain about 10% to about 45% and, more preferably, 20% to 40% butyl acrylate—the balance being ethylene. n-Butyl acrylate is a preferred comonomer.

Blends of EVA and EBA can also be advantageously utilized. The EVA will generally constitute the major component of the blend, but this is not necessary. The EVA will most typically constitute greater than 75% of the blend.

It is also possible to include minor proportions of other crosslinkable polymers or copolymers in the composition of this invention; however, ethylene copolymers as described above should comprise at least 50% of the total polymers present. Representative of such minor polymeric components which can be used in such embodiments include polyethylene, polypropylene, ethylene-propylene copolymers and terpolymers, and the like. Low density polyethylene and linear low density polyethylene having melt indexes from 0.5 to 5 provide particularly desirable blends when present in amounts of 30% or less, based on the total polymer.

The ethylene copolymers and blends thereof will typically have melt indexes from 0.1 to 7 g/10 min. The EVA copolymers will usually have a melt index from about 0.5 to 5 whereas the melt index of EBA copolymers generally ranges from 0.1 to 3.

THE HYDRATED INORGANIC FILLER

To obtain the superior balance of properties necessary for wire and cable applications, it is necessary that a hydrated inorganic filler be used in formulating the polymeric compositions. The fillers used in the present invention are hydrated inorganic fillers, e.g., hydrated aluminum oxides ($Al_2O_3 \cdot H_2O$ or $Al(OH)_3$), hydrated magnesia, hydrated calcium silicate, hydrated magnesium carbonates, or the like. Of these compounds, hydrated alumina is most advantageously employed. The water of hydration present in the inorganic filler must be capable of being released during the application of heat sufficient to cause combustion or ignition of the ethylene copolymers. While minor amounts of other types of fillers may be tolerated, large amounts of such filler cannot be utilized.

Since the water of hydration chemically bound to the inorganic filler is released endothermically, the hydrated inorganic filler imparts flame retardance. In fact, they increase flame retardance to a far greater degree than other fillers previously used by the art to impart flame retardance to insulation, e.g., carbon black, clays, titanium dioxide, etc. What is even more surprising is that flame retardance is combined with excellent electrical insulation properties at the high filler loadings used. The filler size should be in accordance with those sizes used by the prior art.

THE SILANE COMPONENT

One or more alkoxy silanes comprise the second component of the improved compositions of the present invention. Any alkoxy silane can be used which does not adversely affect the desired balance of properties and which facilitates binding the polymer and inorganic filler with the proviso that the silane can not be combustible or degrade during polymer processing or interfere with polymer crosslinking.

Alkoxysilanes used in forming the insulating compositions include lower alkyl-, alkenyl-, alkynyl-, and aryl-alkoxysilanes containing from 1 to 3 alkoxy substituents having from 1 to 6 and, more preferably, 1 to 3 carbon atoms. Alkoxysilanes having 2 or 3 $C_{1-3}$ alkoxy substituents, e.g. methoxy, ethoxy, propoxy or combinations thereof, are particularly advantageous. Illustrative silanes include methyltriethoxysilane, methyltris(2-methoxyethoxy)silane, dimethyldiethoxysilane, ethyltrimethoxysilane, vinyltris(2-methoxyethoxy)silane, phenyltris(2-methoxyethoxy)silane, vinyltrimethoxysilane and vinyltriethoxysilane, and gammamethacryloxypropyltrimethoxysilane.

It is preferred to use vinyl alkoxysilanes for best results. Of the vinyl alkoxysilanes, gammamethacryloxypropyltrimethoxysilane of the formula

vinyltris(2-methoxyethoxy)silane of the formula

vinyltrimethoxysilane of the formula

 and vinyltriethoxysilane of the formula

are especially useful. Vinyltrimethoxysilane is particularly advantageous for use in the improved compositions of the invention.

THE ANTIOXIDANT

Conventional antioxidants, such as those known to this art, can be utilized for this purpose. For example, polymerized 1,2-dihydro-2,2,4-trimethyl quinoline and tris(3,5-di-t-butyl-4-hydroxy benzyl) isocyanurate can be employed. Various thio compounds and hindered phenols, such as those disclosed in U.S. Pat. No. 4,381,362 also provide effective stabilization. Combinations of these latter antioxidants have been demonstrated to be particularly effective and make it possible for the resulting compositions to pass the Canadian Standards Association (CSA) varnish test. Combinations of distearyl-3,3'-thiodipropionate (DSTDP) and tetrakis(methylene(3,5-di-t-butyl-4-hydroxyhydrocinnamate)) methane are most notable in this regard. The CSA test is described in detail in the above-noted reference.

In addition to the foregoing, various other thio compounds, such as dilauryl-3,3'-thiodipropionate, dimyristylthiodipropionate, ditridecylthiodipropionate, bis alkyl sulfides, and hindered phenols, such as 2,6-di-t-butyl-p-cresol, octadecyl 3,5-di-t-butyl-4-hydroxyhydrocinnamate, 2,2'-methylene bis(6-t-butyl-4-methyl-phenol), 4,4'-butylidene bis(6-t-butyl-3-methyl phenol), 1,3,5-trimethyl-2,4,6-tris(3,5-di-t-butyl-4-hydroxybenzyl) benzene, and 2,2'-methylene bis(4-methyl-6-t-butylphenol) can be used.

Also, other antioxidants and stabilizers known to the art for the stabilization of polyolefin resins can be utilized. These can be employed alone or together with the above noted antioxidants or antioxidant systems. Such stabilizers include ultraviolet light stabilizers of the hindered amine, benzophenone or nickel type. Antioxidants and stabilizers utilized should not have a detrimental effect on polymer crosslinking.

In a particularly useful embodiment of this invention, a bis alkyl sulfide is employed in combination with tetrakis (methylene (3,5-di-t-butyl-4-hydroxyhydrocinnamate)) methane. By using wire and cable formulations containing this combination of antioxidants, particularly when employed at a ratio from 1.5:1 to 3:1 (sulfide:phenol), it is possible to significantly reduce and in some cases completely eliminate undesirable discoloration of the conductor. The use of certain widely used thio antioxidants, such as DSTDP, in insulation formulations, produces undesirable discoloration of the surface of the copper conductor under certain processing conditions. The presence of even slight discoloration or tarnish on the surface of the copper wire can interfere with the ability to produce sound connections by soldering. A fresh clean wire surface after stripping is particularly desirable in automated soldering operations.

Useful bis alkyl sulfides are commercially available. One such product is commercially available under the designation ANOXSYN TM 442.

THE PROCESSING ADDITIVES

The use of additives to facilitate processing of filled polymer compositions, in general, and, more specifically, the crosslinkable flame retardant polymeric compositions of the type encompassed by the invention is well known. Even though the role which various process additives play is not clearly understood and subject to considerable speculation and discussion, i.e. whether they are internal or external lubricants, whether they coat or bind the filler, etc., they are nevertheless considered to be essential for efficient mixing of the compounding ingredients and to achieve uniform, trouble-free extrusion of the formulated composition onto the wire and cable.

One or more processing aids, i.e., lubricants, is required in the formulation of the crosslinkable compositions disclosed in the above-referenced North et al and Biggs et al patents. These lubricants, in addition to facilitating processing, are considered to be important to improve the stripping properties of the wire or cable insulation and include fatty acid soaps, such as calcium stearate and aluminum stearate, silicone oils, long-chain aliphatic amides, natural and synthetic waxes and low molecular weight polyethylene. A particularly useful lubricant combination disclosed in U.S. Pat. No. 4,349,605 for use in radiation curable polymeric compositions is a mixture of lauric acid and ethylene-bis-stearamide.

Generally speaking, extrusion coating of wire and cable is not limited by the equipment used but rather by the processability of the insulation compositions. If compositions having improved processability were available, the output of most coating lines could be significantly increased. It is therefore a continuing objective within the wire and cable industry to improve processability of insulation compositions so that line speeds can be increased. This, of course, must be accomplished without significantly altering the physical properties of the insulation material.

Heretofore it has not been possible to significantly improve processability of highly filled crosslinkable flame retardant compositions without compromising physical properties or otherwise adversely affecting the quality of the insulation coating. One cannot simply increase the amount of a known lubricant additives, such as the lauric acid/EBS lubricant package. While this may facilitate blending, it creates other problems. For example, it can lead to exudation of one of the lubricants or other additive, contribute to "die drool", and cause surging. "Die drool" is an undesirable build up of extrudate on the lips of the die. During operation, these build ups periodically release and are transferred to the surface of the insulated wire forming lumps or rings on the insulated wire. In assembling the insulated wire into wiring harnesses, the section of wire containing these imperfections must be cut out and discarded. In extreme instances surging is obtained which results in the application of an insulation coating of uneven thickness. Too thick an application of insulation results in increased manufacturing costs whereas an inadequate thickness of the insulation layer will result in burn through and shorting. An excessive amount of lubricant can also significantly decrease the physical properties of the crosslinked composition and make it difficult or impossible to obtain the mechanical shear required to adequately mix the composition in an intensive mixer.

It has now been discovered that by utilizing a low molecular weight processing additive, by itself or in combination with other known processing aids, that processability of these crosslinkable formulations can be significantly improved without the adverse effects heretofore obtained. Additionally, a surprising increase in resistance to scorch and increased heat stability of the crosslinked product are observed. Whereas some improvement in processability might be predicted by the use of these polymeric processing agents, a significant increase in the scorch time without decreasing total cure and a significant increase in the heat stability of the composition after crosslinking are totally unexpected.

Useful polymeric processing agents for the invention are predominantly aliphatic resins having an average molecular weight less than about 2000 and containing ester functional groups. The resins are a mixture of oligomers. While the molecular weight distribution of the polymeric products can vary, predominant oligomers will have molecular weights below 2000. A portion of the oligomers comprising the aliphatic resin mixture contain ester functional groups, such as acetoxy groups. The resin mixtures are solid materials having specific gravities from about 0.92 to about 0.98 and softening points from about 90° C. to about 110° C. They exhibit good solubility in aliphatic, aromatic and chlorinated hydrocarbons.

Low molecular weight polymeric processing additives of the above type are conveniently obtained by combining an aliphatic hydrocarbon resin derived from petroleum cracking streams with an ester-containing resin. Both the hydrocarbon resin and ester-containing resin are comprised of oligomers having molecular weights less than 2000. The ratio of the hydrocarbon resin to ester-containing resin can vary widely depending on the particular resins used. Most commonly, the mixture will contain from 50 to 95% of the hydrocarbon resin and 5 to 50% of the ester-containing resin. More preferably, the hydrocarbon resin will comprise 60 to 92% of the mixture with the ester-containing resin comprising the balance.

Aliphatic hydrocarbon resins utilized for the polymeric processing additive are well known and commercially available. They are produced by the Friedel-Crafts catalyzed polymerization of various mixed olefin streams obtained from petroleum cracking operations. Resin properties will vary depending on composition of the feedstock, the particular catalyst used and reaction conditions. Hydrocarbon resins used for the polymeric processing additives are derived from primarily aliphatic olefin monomers. Most advantageously they are produced from feedstocks referred to within the industry as C-5 streams since this approximates the average number of carbon atoms per monomer molecule.

The ester-containing resin present with the hydrocarbon resin to make up the polymeric processing modifier is typically an olefin-vinyl ester copolymer. Ethylene-vinyl ester copolymers are especially advantageous with ethylene-vinyl acetate copolymers being particularly preferred. Vinyl acetate contents of these copolymers will range from 12 to 32% and, more commonly, from 15 to 25%.

Minor amounts of other low molecular weight resins, such as polyethylene, may also be present with the hydrocarbon resin and olefin-vinyl ester copolymer. The oligomer mixtures comprising the polymeric processing modifiers will typically contain 80–90%C, 8–15%H and 0.5–7%O. Polymeric processing modifiers meeting the above requirements are commercially available from Struktol Company under the designations Struktol Polydis® TR060 and Struktol Polydis® SA9001.

To obtain the necessary balance of processability and physical properties required for most wire and cable applications, it is generally advantageous to include one or more additional processing aids with the polymeric resin processing modifier. While any known processing agent can be employed for this purpose, superior results have been obtained when these materials are fatty acids or fatty acid derivatives such as metal soaps, esters, ester-soaps, amides, and the like. The term fatty acid as employed herein, refers to aliphatic carboxylic acids having from 8 to 22 carbon atoms. While these acids are usually derived from natural sources, they can also be synthetically produced. The fatty acids can be branched or straight-chain, saturated or unsaturated and they may consist of a single acid, or as is more commonly the case, a mixture of acids within the specified carbon content range. Illustrative fatty acids include caproic acid, caprylic acid, capric acid, lauric acid, myristic acid, myristoleic acid, palmitic acid, palmitoleic acid, stearic acid, isostearic acid, oleic acid, linoleic acid, eleostearic acid, behenic acid, erucic acid and the like. Useful fatty acid mixtures are obtained from triglycerides present in natural fats and oils including coconut oil, cottonseed oil, linseed oil, palm oil, soy oil, tall oil, safflower oil, corn oil, rapeseed oil, tallow or the like.

While the fatty acids or mixtures may be utilized as such they are more commonly employed in their derivative forms. Alternatively, a mixture of fatty acid and fatty acid derivative can be used. Especially useful fatty acid derivatives which can be used, alone or in admixture with the same or different fatty acid, are the calcium or aluminum soaps and amides, including bis-amides formed by the reaction of two moles of a fatty acid or fatty acid ester with one mole of an aliphatic diamine, e.g., ethylene diamine. It is necessary to avoid soaps which interfere with the crosslinking reaction (a free radical mechanism), such as zinc soaps, and which react with organic peroxides. Acceptable soaps are the alkaline earth metal fatty acid soaps and calcium stearate has been found to be particularly advantageous. Erucamide and ethylene-bis-stearamide are particularly useful fatty acid amides. In one highly useful embodiment of the invention, the fatty component consists of a mixture of a fatty acid with a fatty acid amide present in a ratio from 2:1 to 1:10. Combinations of lauric acid and ethylene-bis-stearamide are most notable in this regard. If a fatty component is employed with the polymeric resin to comprise a processing additive package, the ratio of fatty acid (or derivative) to aliphatic polymer resin will range from 3:1 to 1:8 and, more preferably, from 2:1 to 1:5.

Also, since it is often advantageous to utilize a mixture of lubricants with different melting points and chemical structures, natural or synthetic hydrocarbon waxes or low molecular weight polyethylenes can function as part of a lubricant system to obtain the desired balance of processing properties.

COMBINING THE COMPONENTS

The compositions of the invention may be formed in a number of ways provided that the filler and silane are intimately contacted. The silane may be added directly to the filler and dispersed in the polymer using a high shear internal mixer such as a Banbury, Farrel Continuous Mixer, Bolling Mixtrumat TM or Werner & Pfleiderer mixer and the antioxidant, lubricant and processing agent then added. Alternatively, the silane is first added to the polymer followed by addition thereto of the filler, antioxidant, lubricant, processing agent and any other additives. All compounding ingredients can be charged to the mixer at the initiation of mixing as long as the silane and filler have intimate contact during the mixing process.

The hydrated inorganic filler in the composition can be varied within wide limits. The filler can range from 80 to 400 parts per 100 parts of the polymer resin (phr). Most commonly, from 80 to 200 phr of filler is employed. The alkoxysilane will range from about 0.5 to 5 phr and, more preferably, from 0.75 to 4 phr. Too small an amount may be insufficient to provide adequate surface treatment of the filler while too large a quantity can have an adverse effect on physical properties, primarily percent elongation, after crosslinking.

The antioxidant or antioxidant package will be selected to meet the service requirements for the particular polymer being used but will generally be present from 0.5 to 8 phr and, more preferably, from 1 to 6 phr. Higher levels of antioxidant are required for high temperature wire and cable applications. If two or more antioxidants are employed they may be added to the formulation separately or combined prior to incorporation.

From 0.25 to 8 phr of the polymeric processing additive is utilized. For reasons not completely understood, use of the mixed aliphatic resin by itself or in combination with 0.25 to 5 phr fatty acid or fatty acid derivative or mixture thereof significantly improves properties in both the uncrosslinked and crosslinked composition. The uncrosslinked compositions exhibit improved processability; particularly, the time before the onset of scorch under the processing conditions is significantly increased. This provides the processor with greater flexibility in the selection of operating conditions and, in some cases, makes it possible to increase the line speed of the coating operation. The broadened operating window also makes it possible to accommodate unanticipated changes in processing conditions which frequently occur and which can result in the production of unacceptable product or catastrophic failure, i.e. blowing the extruder head or freeze-up of the extruder. Upon crosslinking, the compositions develop acceptable physical properties and, quite unexpectedly, the essential physical properties are retained for a longer period upon heat aging. In a particularly useful embodiment of the invention, 1 to 6 phr of a combination of processing additives comprised of the polymeric processing agent, i.e., the mixed aliphatic resin, a fatty acid and a fatty acid amide are employed.

In addition to the previously mentioned mixers, other processing devices known to the art capable of intimately mixing the essential components may be used. The compositions may also contain other additives, such as carbon black, pigments and the like, provided they do not interfere with crosslinking or detract from the physical properties of the composition. The total amount of any additional ingredients will generally not exceed about 15 phr. In one highly useful embodiment of the invention, from 1 to 8 phr of a chemical crosslinking agent is included in the formulation.

The ethylene-vinyl ester and ethylene-alkyl acrylate copolymers formulated as hereinabove described can be crosslinked using conventional procedures known to the art, such as by high-energy irradiation or by the use of chemical crosslinking agents. Fully crosslinked, these polymers exhibit thermoset behavior and provide a superior and unexpected balance of:

(1) low temperature brittleness, i.e., the compositions do not readily crack during low temperature movement (ASTM D-746);
(2) heat resistance after aging, i.e., excellent elongation after extended service at 90° C., 125° C. or even 135° C.;
(3) arcing and tracking resistance as high as 5 KV;

(4) resistance to ignition by flame and flame retardance;
(5) moisture resistance i.e., low mechanical absorption of water providing retention of dielectric properties in wet and humid environments;
(6) dielectric properties;
(7) oil resistance; and
(8) resistance to industrial chemicals It has been demonstrated that for low voltage environments, i.e., less than 5000 volts and more commonly less than 600 volts, the compositions of this invention are particularly useful for service as uniinsulation. Uniinsulation is an art accepted term denoting insulation where one layer is extruded around a conductor. This single layer serves as the electrical insulation and the jacketing to provide physical and flame protection. The present compositions are especially well suited for service as uniinsulation where a superior balance of properties is required. It has been observed that the compositions can contain a high loading of filler and still provide high flexibility and a high degree of crosslinking. Moreover, the ability to achieve high filler loading, flexibility and crosslinking with improved processability and heat aging is a significant advance in the wire and cable insulation art.

Any means known for crosslinking ethylene copolymers can be utilized with the compositions of this invention. While it is possible to thermally crosslink the compositions, it is more common to utilize a source of high energy ionizing radiation or a chemical agent for this purpose.

High energy radiation sources which can be used to crosslink these compositions include cobalt-60, $\beta$-rays, $\gamma$-rays, x-rays, electron beams, accelerators or the like. Electron beam radiation is a particularly advantageous method of radiation crosslinking. The art of radiation crosslinking is so highly developed that little need be said with respect to such procedures. As higher total doses of radiation are used, the degree of crosslinking generally increases. For effective crosslinking a total radiation dose of about 5 to 25 megarads is generally required.

Chemical crosslinking can be accomplished by the use of conventional agents known to generate free radicals upon decomposition. Organic peroxides are most commonly employed for this purpose. In view of the ability to rapidly achieve high levels of cure using chemical crosslinking agents and the uniformity of the results obtainable therewith, this method is widely practiced to cure wire and cable insulation. Chemical crosslinking is accomplished by incorporating the organic peroxide or other crosslinking agent into the composition at a temperature below the decomposition temperature of the crosslinking agent. The chemical agent is later activated to cure the composition, i.e., crosslink the ethylene copolymer into a three-dimensional network.

This crosslinking is carried out in accordance with procedures well known to the art and variations in the general conditions necessary to effect same will be apparent to those skilled in the art. The invention is not limited to the use of organic peroxides for chemical crosslinking—other art recognized materials which decompose to provide free radicals can also be used. Obviously such crosslinking agents should not decompose during compounding. Known crosslinking coagents, such as triallylcyanurate and the like, may also be included to increase the effectiveness of the cure.

Tertiary organic peroxides are especially useful chemical crosslinking agents. Dicumyl peroxide and alpha, alpha'-bis(t-butylperoxy) diisopropylbenzene are particularly advantageous. As with most other chemical crosslinking agents, the tertiary organic peroxides are activated by heating to above their activation temperature whereupon decomposition occurs. Any of the known procedures to accomplish decomposition, such as the application of high pressure steam or the like, can be used.

The crosslinking is generally carried out at superatmospheric pressures, on the order of 100 psi to 400 psi, although higher or lower pressures may be used. Pressure is employed to avoid developing porous crosslinked compositions which are unsuitable for electrical insulation.

In general, as the amount of crosslinking agent is increased the degree of crosslinking increases. Usually, no more than about 8 phr organic peroxide is necessary and, most preferably, 1.5 to 5 phr peroxide is used. Other crosslinking agents may require some variation in the amount used. The higher the degree of crosslinking, the greater is the toughness and the greater is the resistance to moisture and chemical reagents of the polymeric composition. When too low a degree of crosslinking is achieved, the physical properties of the product are inadequate and subject to pronounced deterioration upon aging. Insufficient crosslinking results principally in a deficiency in retention of stiffness at elevated temperature since the material will have too low a softening point. The exact degree of crosslinking is therefore varied to take the above factors and their effect on the final product into account. For wire and cable insulation the level of crosslinking is generally greater than 80% although lower values are possible. Crosslinking is determined by extraction of the crosslinked polymer to measure the amount of insoluble gel. Crosslinking levels of 85% to 95% are most typical.

EXAMPLES

Various aspects of the invention are described in greater detail in the examples which follow. These examples are for illustration purposes only and are not intended to limit the invention. Numerous variations are possible without deviating from the spirit and scope of the invention and will be apparent to those skilled in the art.

To prepare the formulations used in the examples the ingredients were added to a Banbury mixer and mixed at a temperature below the decomposition temperature of the peroxide, usually about 110°–125° C., until a homogeneous mixture was obtained. Generally, to achieve uniform dispersion of the compounding ingredients in the copolymer required about 3-5 minutes mixing. The mixture was then extruded to obtain the product in pellet form. A conventional extruder fitted with an extruder die and an underwater pelletizer was employed for this operation. The pelletized product was recovered and utilized for subsequent evaluations.

Physical properties (tensile and elongation) of the products were determined in accordance with ASTM D-638. Samples were cured for 6 minutes in a compression mold maintained at 250 psi and 200°–205° C. Under these conditions, cures of 80% or greater with tensile strengths of at least 1800 psi, and more generally greater than 2000 psi, and elongations greater than 200% are typically achieved. The cure level (% gel) was determined in accordance with ASTM D-2765, Method C.

Resistance to thermal aging was determined by heating samples in a forced-air circulating oven for extended periods up to as long as 60 days. Since the samples become brittle as they deteriorate in the heat aging process, the extent of deterioration was determined by observing the decrease in elongation with time. Products are considered to be marginal when upon heat aging the elongation drops below 175% or the % retention of the unaged elongation falls below 75%. For compositions designed for 125° C. continuous service, accelerated heat aging tests were conducted at 158° C. Accelerated heat aging tests were carried out at 165° C. for compositions formulated for 135° C. continuous service and at 180° C. for 150° C. continuous service.

For meaningful comparison of physical properties of different products, the degree of cure of the products being compared should be 80% or greater and, preferably, within 5% of each other. Electrical properties (dielectric constant and dissipation factor) of cured compositions were determined in accordance with ASTM D-150

Extrusion evaluations were performed using a 1 inch diameter Brabender extruder having three electrically heated zones and an air-cooled barrel. The extruder had a 20:1 length to screw diameter ratio. A polyethylene-type screw with 20 flites and a 4:1 compression ratio was employed and a pressure gauge was located at the end of the screw at the location where a breaker plate is normally employed. The extruder was equipped to measure the torque required to process the material.

A Brabender wire insulating die assembled for the insulation of 18 AWG wire was employed with a wire inserted through and fixed in the die. While the wire was not pulled through the die for these laboratory extrusions, a strand was produced with the same restrictions at the die orifice as encountered during wire insulation using production units.

The extruder barrel zones 1, 2, and 3 were set at 210° F., 220° F., and 230° F., respectively, and the die temperature was set at 230° F. Screw speed was maintained at 100 rpm. These conditions effectively measure the relative processability of different insulation compositions and the tendency of the materials to increase temperature at the compression area (zone 2) of the screw. Temperatures, head pressure and torque were recorded versus time to measure the relative ability of materials to be processed at high extrusion speed without developing scorch, i.e., prematurely crosslinking. When the temperature in zone 2 increased to 295°-300° F. the crosslinked material was quickly purged with uncompounded copolymer resin to avoid freeze-up of the extruder with crosslinked material. This temperature is the point where catastrophic uncontrolled crosslinking begins to occur. If unchecked, this will result in the formation of an intractable product incapable of being uniformly flowed onto a wire or cable and ultimately can freeze-up the extruder. With some control materials, the heat build up was so rapid that considerable scorching could not be avoided. Between each extrusion run, the extruder was purged with uncompounded resin until the initial operating conditions were again reached.

Example I: To demonstrate the significantly improved resistance to heat aging obtained with compositions prepared in accordance with the present invention utilizing a polymeric processing agent, three formulations were prepared and evaluated from the following masterbatch:

|  | Parts |
|---|---|
| Ethylene-Vinyl Acetate Copolymer | 100.0 |
| Hydrated Alumina | 125.0 |
| Vinyltrimethoxysilane | 1.5 |
| Tetrakis(methylene(3,5-di-t-butyl-4-hydroxyhydrocinnamate)) methane | 2.0 |
| Distearyl-3,3'-thiodipropionate | 1.0 |
| Alpha, alpha'-bis(t-butylperoxy)diisopropyl benzene | 1.7 |

The EVA copolymer used contained 18% VA and had an MI of 2.3 to 2.5. The above composition was formulated with a polymeric processing agent (Struktol Polydis ® TR060) at two different levels. The polymeric processing agent is a mixture comprised predominantly of a major portion of petroleum resin oligomers and a minor amount of acetoxy-containing oligomers, the predominant oligomers of both the hydrocarbon resin and the ester-containing resin having molecular weights less than 2000. The mixed light amber resin had a specific gravity of about 0.95, softening point of about 102° C., flash point greater than 230° C. and TGA (5% loss) of 325° C. The mixed resin processing agent is comprised predominantly of carbon and hydrogen (approx. 87%C and 12%H) with approximately 1% oxygen and trace amounts of sulfur and nitrogen. The first composition, identified as Product I(A), contained 1 phr of the aliphatic resin mixture and a second composition, identified as Product I(B), contained 1.5 phr of the mixed aliphatic resin processing agent. A third composition, identified as Comparison I, contained no polymeric processing modifier but rather was prepared using a conventional lubricant additive package of the type disclosed in U.S. Pat. No. 4,349,605, namely, 0.25 phr lauric acid and 0.75 phr ethylene-bis-stearamide. Samples were prepared from each composition and cured to 93±2%. Tensile and elongation properties of the samples were determined initially and then after aging for 18 days at 163° C. Results were as follows:

|  | Prod. I (A) | Prod. I (B) | Comp. I |
|---|---|---|---|
| Initial Physical Properties: |  |  |  |
| Tensile (psi) | 2900 | 2800 | 2980 |
| Elongation(%) | 200 | 220 | 200 |
| Physical Properties After Heat Aging: |  |  |  |
| Tensile (psi) | 2760 | 2780 | 2030 |
| % Retention of Unaged Tensile | 95.2 | 99.3 | 68.1 |
| Elongation (%) | 180 | 190 | 100 |
| % Retention of Unaged Elongation | 90.0 | 86.4 | 50.0 |

The above results clearly demonstrate the improved heat stability of the resulting cured compositions prepared using the aliphatic resin processing agent. The compositions containing the aliphatic resin exceed the 175% elongation minimum after the 18 day aging interval whereas the product prepared using the conventional lubricant additive package is far below the 175% elongation standard. Expressed differently, there is a 50% reduction in the elongation of the control composition after 18 days aging at 163° C. whereas the elongation of Products I(A) and I(B) decreased only 10% and 13.6%, respectively. Comparable results are obtained when a mixed aliphatic resin processing aid having a substantially higher ester content based on elemental analysis, Struktol Polydis ® SA9001, is substituted into the above formulations.

Example II: To demonstrate the ability to utilize the polymeric processing agent in combination with other conventional processing aids, the following formulation was prepared:

|  | Parts |
| --- | --- |
| EVA Copolymer of Example I | 100.0 |
| Hydrated Alumina | 125.0 |
| Vinyltrimethoxysilane | 1.5 |
| Tetrakis(methylene(3,5-di-t-butyl-4-hydroxyhydrocinnamate)) methane | 2.0 |
| Distearyl-3,3'-thiodipropionate | 1.0 |
| Alpha, alpha'-bis(t-butylperoxy)diisopropyl benzene | 1.7 |
| Lauric Acid | 0.25 |
| Ethylene-bis-stearamide | 0.75 |
| Polymeric Resin Processing Agent | 1.0 |

The above ingredients were blended and samples prepared and cured in the conventional manner. Tensile strength of the cured composition was 2200 psi with an elongation of 230%. After aging for 18 days at 163° C. the elongation was still 190% (82.6% retention of the original elongation). The tensile strength of the product after aging was actually higher (2690 psi) than the original value. Such increases in tensile are not uncommon and are believed to be the result of additional curing during the heat aging. The above example not only shows the ability to utilize a mixed aliphatic resin processing aid in conjunction with other known processing agents but also demonstrates the ability to raise the heat stability of compositions formulated with conventional lubricants to acceptable levels by the addition of a polymeric processing additive thereto.

Example III: A formulation identical to that of Example II was prepared using an EVA copolymer containing 18% VA but having an MI of 1.3-1.5. The composition after curing (92.8% gel) had a tensile of 2810 psi and elongation of 250%. Physical properties of the composition after 7, 14, and 18 days aging at 163° C. were as follows:

| 7 Days: |  |
| --- | --- |
| Tensile (psi) | 3100 |
| % Retention of Unaged Tensile | 110.3 |
| Elongation (%) | 230 |
| % Retention of Unaged Elongation | 92.0 |
| 14 Days: |  |
| Tensile (psi) | 2840 |
| % Retention of Unaged Tensile | 101.1 |
| Elongation (%) | 190 |
| % Retention of Unaged Elongation | 76.0 |
| 18 Days: |  |
| Tensile (psi) | 2620 |
| Retention of Unaged Tensile | 93.2 |
| Elongation (%) | 170 |
| % Retention of Unaged Elongation | 68.0 |

Where the % elongation after 18 days aging is considered to be only marginally acceptable, it is a significant improvement over the 70% elongation obtained with a control containing no aliphatic resin processing agent. The 70% elongation obtained for the control represents only 39% retention of the original (unaged) elongation value.

Example IV: A series of compositions were prepared with varying levels of aliphatic resin processing agent in accordance with the following recipes:

| Product No. | IV(A) | IV(B) | IV(C) | IV(D) | IV(E) |
| --- | --- | --- | --- | --- | --- |
| EVA Copolymer (18% VA; MI 1.3-1.5) | 100.0 | 100.0 | 100.0 | 100.0 | 100.0 |
| Hydrated Alumina | 125.0 | 125.0 | 125.0 | 125.0 | 125.0 |
| Vinylmethoxysilane | 1.5 | 1.5 | 1.5 | 1.5 | 1.5 |
| Tetrakis(methylene (3,5-di-t-butyl-4-hydroxyhydrocinnamate)) methane | 1.0 | 1.0 | 1.0 | 1.0 | 1.0 |
| Bis Alkyl Sulfide (ANOXSYN ™ 442) | 2.0 | 2.0 | 2.0 | 2.0 | 2.0 |
| Alpha, alpha'-bis (t-butylperoxy) diisopropyl benzene | 1.7 | 1.7 | 1.7 | 1.7 | 1.7 |
| Lauric Acid | 0.25 | 0.25 | 0.25 | 0.25 | 0.25 |
| Ethylene-bis-stearamide | 0.75 | 0.75 | 0.75 | 0.75 | 0.75 |
| Mixed Aliphatic Resin Processing Agent | 0.5 | 1.0 | 2.0 | 3.0 | 5.0 |

Processability of each of the above formulations was evaluated in accordance with the previously described procedure using the Brabender extruder. Head pressure and torque were measured for each sample and are reported in Table I. Time (in minutes) required for the temperature in Zone 2 (the compression zone) to reach 290° F. was also recorded. This is an indication of the length of time the composition can be processed under operating conditions before crosslinking begins to occur. The problems associated with premature crosslinking in the extruder have previously been pointed out. Additionally, visual observation of the extrudate was made and the time at which the first indication

TABLE I

| Product No. | IV(A) | IV(B) | IV(C) | IV(D) | IV(E) |
| --- | --- | --- | --- | --- | --- |
| Extrusion Data: |  |  |  |  |  |
| Head Pressure (psi) | 6200 | 6150 | 6000 | 5900 | 5650 |
| Torque (meter-grams) | 4550 | 4550 | 4500 | 4450 | 4400 |
| Time for Temperature in Zone 2 to reach 290° F. (minutes) | 8 | 8 | 9 | 10+ | 10+ |
| Time to Scorch (minutes) | 9+ | 9+ | 10+ | 10+ | 10+ |
| Cure Level (%) | 92.9 | 92.4 | 91.8 | 90.7 | 88.6 |
| Physical Properties: (Unaged) |  |  |  |  |  |
| Tensile (psi) | 3060 | 3040 | 2850 | 2930 | 2700 |
| Elongation (%) | 240 | 220 | 200 | 260 | 210 |
| Physical Properties: (heat-aged): |  |  |  |  |  |
| Tensile (psi) | 3020 | 3140 | 3060 | 2990 | 2920 |
| % Retention of Unaged Tensile | 98.7 | 103.3 | 107.4 | 102.0 | 108.1 |
| Elongation (%) | 190 | 220 | 220 | 220 | 220 |
| % Retention of Unaged Elongation | 79.2 | 100.0 | 110.0 | 84.6 | 104.8 |
| Electrical Properties: |  |  |  |  |  |
| Dielectric Constant (1,000 Hz) | 3.75 | 3.76 | 3.77 | 3.78 | 3.77 |
| Dissipation Factor (1,000 Hz) | .0080 | .0082 | .0079 | .0077 | .0074 | of roughness or unevenness appeared was recorded and is reported in the table as the time to scorch. Times provided in the table which are followed by a plus sign indicate that the extrusion was terminate before 290° F. was reached or before visual scorching of the extrudate was observed.

Each formulation was also cured in accordance with the conventional procedure and evaluated for resistance to heat aging. Electrical properties of the cured products were also determined. Results are set forth in the table. Heat aging data reported are for 18 days at 163° C. The cure level (% gel) was determined for each sample and indicated.

For comparison, a control composition containing all of the ingredients except the aliphatic resin processing agent was extruded under identical conditions. The head pressure obtained for the control was 6400 psi and the torque was 4750 meters-grams. The temperature in Zone 2 of the extruder rose to 290° F. in less than three minutes with the control and visual scorching of the extrudate was observed after only three minutes operation. It is apparent from the foregoing comparative data that a significant improvement in resistance to scorch is obtained with the compositions of the invention containing an aliphatic resin. Furthermore, when an aliphatic resin is included with conventional processing additives, there is a slight reduction of head pressure and torque. Similar improvement is obtained using a commercially available mixed aliphatic resin processing modifier having a substantially higher ester (acetoxy) content, i.e., approximately 5% oxygen by analysis.

Example V: A mixed resin comprised of an ethylene-vinyl acetate copolymer and ethylene-n-butyl acrylate copolymer was formulated as follows:

|  | Parts |
|---|---|
| EVA Copolymer (18% VA; MI 1.3-1.5) | 80.0 |
| EBA Copolymer (19% BA; MI 0.3) | 20.0 |
| Hydrated Alumina | 125.0 |
| Vinyltrimethoxysilane | 1.5 |
| Tetrakis(methylene (3,5-di-t-butyl-4-hydroxyhydrocinnamate)) methane | 1.0 |
| Bis Alkyl Sulfide (ANOXSYN TM 442) | 2.0 |
| Alpha, alpha'-bis (t-butylperoxy) diisopropyl benzene | 1.7 |
| Lauric Acid | 0.25 |
| Ethylene-bis-stearamide | 0.75 |

Three compositions containing varying levels of polymeric resin processing agents were prepared using the above formulation and evaluated in accordance with the procedure described in Example IV. Results are set forth in Table II. Similar results are obtained when blends of EVA and low-density polyethylene are comparably formulated.

TABLE II

| Product No. | V(A) | V(B) | V(C) |
|---|---|---|---|
| Aliphatic Resin (phr) | 1.0 | 2.0 | 3.0 |
| Extrusion Data: | | | |
| Head Pressure (psi) | 6800 | 6700 | 6300 |
| Torque (meter-grams) | 4900 | 4900 | 4650 |
| Time for Temperature in Zone 3 to reach 290° F. (min) | 8 | 9 | 9 |
| Time to Scorch (min) | 8+ | 10+ | 10+ |
| Cure Level (%) | 92.3 | 90.5 | 89.4 |
| Physical Properties: (unaged) | | | |
| Tensile (psi) | 2940 | 2870 | 2830 |
| Elongation (%) | 220 | 250 | 250 |
| Physical Properties: (heat aged 30 days at 163° C.) | | | |
| Tensile (psi) | 2880 | 2930 | 2840 |
| % Retention of Unaged Tensile | 98.0 | 102.1 | 100.4 |
| Elongation (%) | 210 | 220 | 210 |
| % Retention of Unaged Elongation | 95.5 | 88.0 | 84.0 |
| Electrical Properties: | | | |
| Dielectric Constant (1,000 Hz) | 3.80 | 3.75 | 3.75 |
| Dissipation Factor (1,000 Hz) | .0066 | .0074 | .0066 |

Example VI: A wire and cable insulation composition similar to that of Example V but designed for 150° C. continuous service was formulated in accordance with the following recipe:

|  | Parts |
|---|---|
| EVA Copolymer (18% VA; MI 1.3-1.5) | 80.0 |
| EBA Copolymer (19% BA; MI 0.3) | 20.0 |
| Hydrated Alumina | 125.0 |
| Vinyl alkoxysilane | 1.5 |
| High Temperature Stabilizer Package (Antioxidant) | 5.6 |
| Organic Peroxide | 1.7 |
| Lauric Acid | 0.25 |
| Ethylene-bis-stearamide | 0.75 |
| Polymeric Processing Modifier | 1.0 |

The above composition was cured and had a tensile strength of 2340 psi and elongation of 280%. Samples of the product were aged at 180° C. and tensile and elongation properties of the vulcanizate determined after 7 and 14 days. Results were as follows:

| 7 Days: | |
|---|---|
| Tensile (psi) | 2280 |
| % Retention of Unaged Tensile | 97 |
| Elongation (%) | 210 |
| % Retention of Unaged Elongation | 75 |
| 14 Days: | |
| Tensile (psi) | 2570 |
| % Retention of Unaged Tensile | 109.8 |
| Elongation (%) | 200 |
| % Retention of Unaged Elongation | 71.4 |

We claim:

1. A electrical conductor coated with an insulating layer of a crosslinkable polymer composition comprising
   (a) a polymer selected from the group consisting of copolymers of ethylene and vinyl esters of $C_{2-6}$ aliphatic carboxylic acids, copolymers of ethylene and $C_{1-6}$ alkyl acrylates, copolymers of ethylene and $C_{1-6}$ alkyl methacrylates, or mixtures thereof;
   (b) 80 to 400 phr inorganic filler selected from the group consisting of hydrated aluminum oxide, hydrated magnesia, hydrated calcium silicate, and hydrated magnesium carbonate;
   (c) 0.5 to 5 phr of a lower alkyl-, alkenyl-, alkynyl- or aryl-alkoxysilane having from 1 to 3 $C_{1-6}$ alkoxy substituents;
   (d) 0.5 to 8 phr antioxidant; and
   (e) 0.25 to 8 phr low molecular weight polymeric processing additive comprised of aliphatic resins having an average molecular weight less than 2000 and containing ester functional groups.

2. The coated electrical conductor of claim 1 wherein (a) is ethylene-vinyl acetate copolymer, ethylene-butyl acrylate copolymer, or mixtures thereof, (d) is a thio compound, a hindered phenol, polymerized, 1,2-dihydro-2,2,4-trimethyl quinoline, tris(3,5-di-t-butyl-4- hydroxy benzyl)isocyanurate or mixtures thereof and (e) is a mixture of hydrocarbon resin oligomers and ester-containing resin oligomers and wherein the predominant oligomers have molecular weights less than 2000.

3. The coated electrical conductor of claim 2 wherein the conductor is copper wire.

4. The coated electrical conductor of claim 3 wherein the crosslinkable polymeric composition additionally contains from 1 to 8 phr of a chemical crosslinking agent.

5. The coated electrical conductor of claim 4 wherein the chemical crosslinking agent is an organic peroxide, (c) is a vinyl alkoxysilane, (e) has a specific gravity from 0.92 to 0.98 and softening point from 90° C. to 110° C. and additionally containing 0.25 to 5 phr of a second processing additive selected from the group consisting of a fatty acid, a calcium soap of a fatty acid, an aluminum soap of a fatty acid, a fatty acid amide, a mixture of a fatty acid and a fatty acid amide, a natural or synthetic wax and low molecular weight polyethylene.

6. The coated electrical conductor of claim 5 containing 80 to 200 phr (b), 0.75 to 4 phr (c), 1 to 6 phr (d), 0.25 to 5 phr (e) and 1.5 to 5 phr organic peroxide.

7. The coated electrical conductor of claim 6 wherein (a) is an ethylene-vinyl acetate copolymer having from 9% to 30% vinyl acetate polymerized and a melt index from 0.5 to 5.

8. The coated electrical conductor of claim 6 wherein (b) is hydrated alumina.

9. The coated electrical conductor of claim 6 wherein (c) is vinyltrimethoxysilane.

10. The coated electrical conductor of claim 6 wherein (d) is a mixture of distearyl-3,3'-thiodipropionate and tetrakis(methylene (3,5-di-t-butyl-4-hydroxyhydrocinnamate)) methane.

11. The coated electrical conductor of claim 6 wherein (d) is a mixture of a bis alkyl sulfide and tetrakis(methylene (3,5-di-ti-butyl-4-hydroxyhydrocinnamate)) methane.

12. The coated electrical conductor of claim 6 wherein the organic peroxide is dicumyl peroxide.

13. The coated electrical conductor of claim 6 wherein the organic peroxide is alpha, alpha'-bis(t-butylperoxy)diisopropyl- benzene.

14. The coated electrical conductor of claim 6 wherein the second processing agent is a mixture of ethylene-bis-stearamide and lauric acid.

15. The coated electrical conductor of claim 6 wherein (e) is a mixture of aliphatic hydrocarbon oligomers produced by the polymerization of a mixed olefin feed obtained from petroleum cracking with a minor amount of an olefin-vinyl ester copolymer.

16. The coated electrical conductor of claim 7 wherein (a) contains 12 to 32 percent vinyl acetate.

* * * * *